Figure 1:
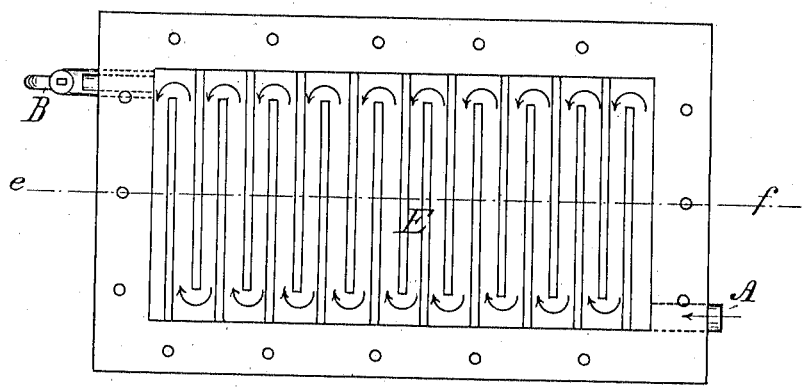

A. CLEMM.
AMMONIA SODA PROCESS.
APPLICATION FILED JULY 24, 1913.

1,118,332.

Patented Nov. 24, 1914.

WITNESSES
Cornelius Hoving
Frank H. Logan

INVENTOR
ADOLF CLEMM
BY W. H. Berrigan
ATTORNEY

UNITED STATES PATENT OFFICE.

ADOLF CLEMM, OF MANNHEIM, GERMANY.

AMMONIA-SODA PROCESS.

1,118,332.  Specification of Letters Patent.  Patented Nov. 24, 1914.

Application filed July 24, 1913. Serial No. 780,917.

*To all whom it may concern:*

Be it known that I, ADOLF CLEMM, doctor of philosophy, Geheimer Kommerzienrat, chemist, a subject of the Grand Duke of Baden and the German Emperor, residing at Bismarckstrasse L, 9, 5, Mannheim, German Empire, have invented a new and useful Improvement in Ammonia-Soda Processes; and I do hereby declare the following to be a full, clear, and exact description of the same.

According to the present invention many of the objections to processes heretofore known are overcome, this being effected as follows: I do not subject to electrolysis the ammonium chlorid lye freed from bicarbonate, but I completely expel the ammonia therefrom by means of an electrolyzed solution of sodium chlorid, which solution contains sodium hydroxid and sodium chlorid. By subjecting to electrolysis the residual solution of sodium chlorid the obtained lye can be utilized again for expelling ammonia as aforesaid. As the completeness of the expulsion of the ammonia is independent of the concentration of the sodium hydroxid, it is not necessary to consider the attainment of as high a concentration of hydroxyl ions as possible, which has hitherto been a consideration in all electrolyses of alkali chlorids. As, in my process, a much smaller concentration of hydroxyl suffices, it is possible to carry out the process so as to obtain an almost theoretical yield relatively to the electric current employed. Although the lyes are used with small content of hydroxid there is obtained a residue consisting of highly concentrated sodium chlorid capable of use again in the process after being electrolyzed.

By the electrolysis of the solution of sodium chlorid and the constant reformation of sodium chlorid on the expulsion of the ammonia, the production of residual waters containing calcium and of wastes and also loss of sodium chlorid are avoided and a perfect process is obtained free of the losses which attend the processes as hitherto conducted for instance the process described in the specification of German Patent No. 216,265.

The application of electrolyzed sodium chlorid solution for expelling the ammonia has also the great advantage over the lime process that clear solutions are dealt with and that the ammonia expulsion process can be made a continuous and smoothly running process, which is preferably carried out in a distillatory apparatus, (provided if desired with a divided vapor space) wherein the lye mixture is caused to take as long a path through the apparatus as possible so that the said lye is gradually freed from its ammonia content, and a salt mixture rich in ammonia is continuously induced while a saturated solution of sodium chlorid free from ammonia runs out. The explosion of the ammonia can, if desired, be facilitated by the withdrawal of the vapors by suction, or otherwise by displacement, or by stirring the liquor, or by a combination of such means.

Figure 2:
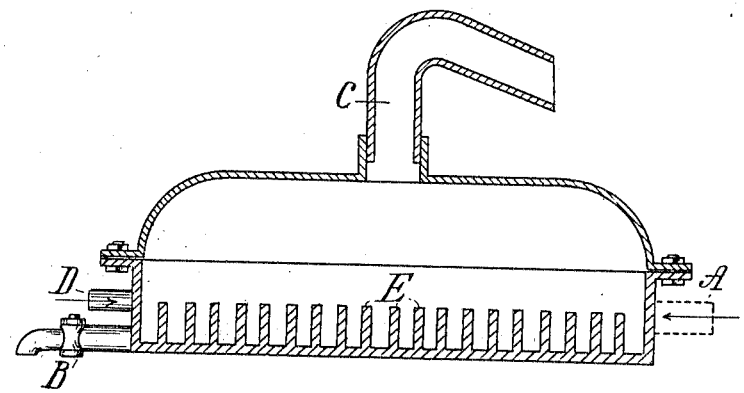

In the accompanying drawing Figure 1 is a plan of an apparatus suitable for use in my process the top cover being removed, and Fig. 2 is a vertical section (on the line *e f* Fig. 1) with the cover in place.

The apparatus can have any other suitable shape, for instance it may be round, or oval. The liquor mixture (consisting of the aforesaid ammonium chlorid lye and electrolyzed solution of sodium chlorid) enters at A, and, by heating is deprived of ammonia while it is caused, by the walls E, to take the extended path from A to B, so that a solution of sodium chlorid as free from ammonia as possible flows out at B. The ammonia escapes at C. At D air, or other gas, or gases, can be introduced for the rapid displacement of the ammonia vapors for facilitating the release of the ammonia from the liquor mixture it is advisable to place, in the spaces between the walls E, wire gauze, filings, or the like presenting an extended surface. The outlet may also be connected to a vessel provided with a stirring device in which vessel any last traces of ammonia present can be expelled from the sodium chlorid solution. The vapor space can if desired be divided into two, or more, compartments, (each with an outlet pipe) for the purpose of separating the concentrated ammonia from that which is more diluted.

I claim:

1. In the ammonia soda process the step which consists in treating the solution of ammonia chlorid, resulting from a previous operation, with partly electrolyzed sodium chlorid solution, expelling the ammonia, subjecting the solution of sodium chlorid obtained to electrolysis and using the said electrolyzed sodium chlorid solution for treating the solution of ammonium chlorid.

2. In the ammonia soda process, the step which consists in treating a solution of ammonium chlorid with a solution containing sodium hydroxid and sodium chlorid, whereby ammonia is formed; expelling the ammonia with heat, whereby a concentrated solution of sodium chlorid is obtained; partly electrolyzing said last named solution, whereby a solution of sodium hydroxid and sodium chlorid is obtained; and continuing the process in a cycle.

Dr. ADOLF CLEMM.

Witnesses:
GILLO JAKOB AUGAN,
JOSEPH PFEIFFER.